No. 712,506. Patented Nov. 4, 1902.
F. CURTIS.
SCREW MAKING MACHINE.
(Application filed Jan. 20, 1902.)
(No Model.) 6 Sheets—Sheet 1.
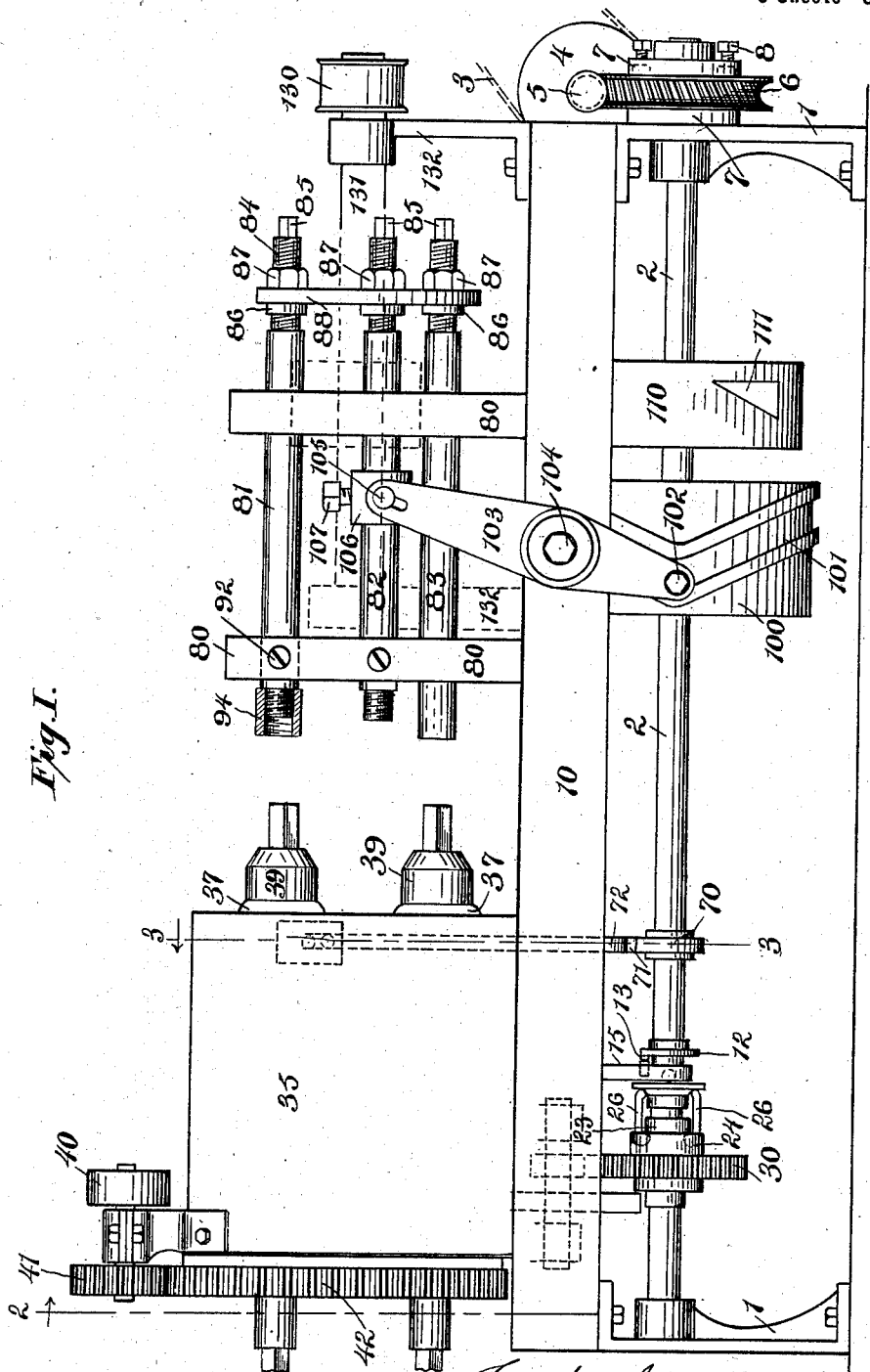
Fig. I.
Witnesses: Frank Curtis Inventor:
Geo. E. Frech. By
F. R. Fitton. Collamer & Co.,
Attorneys.

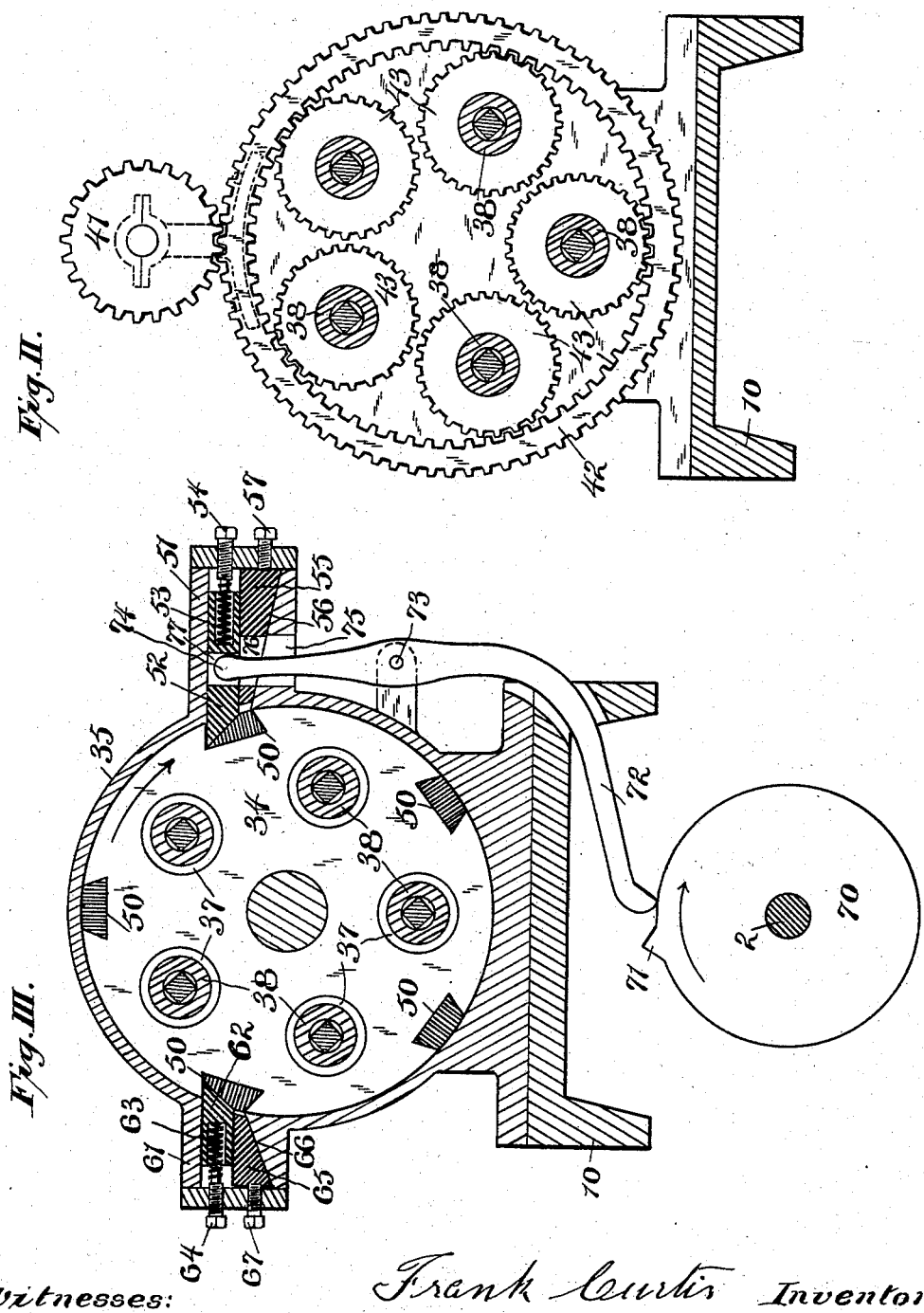

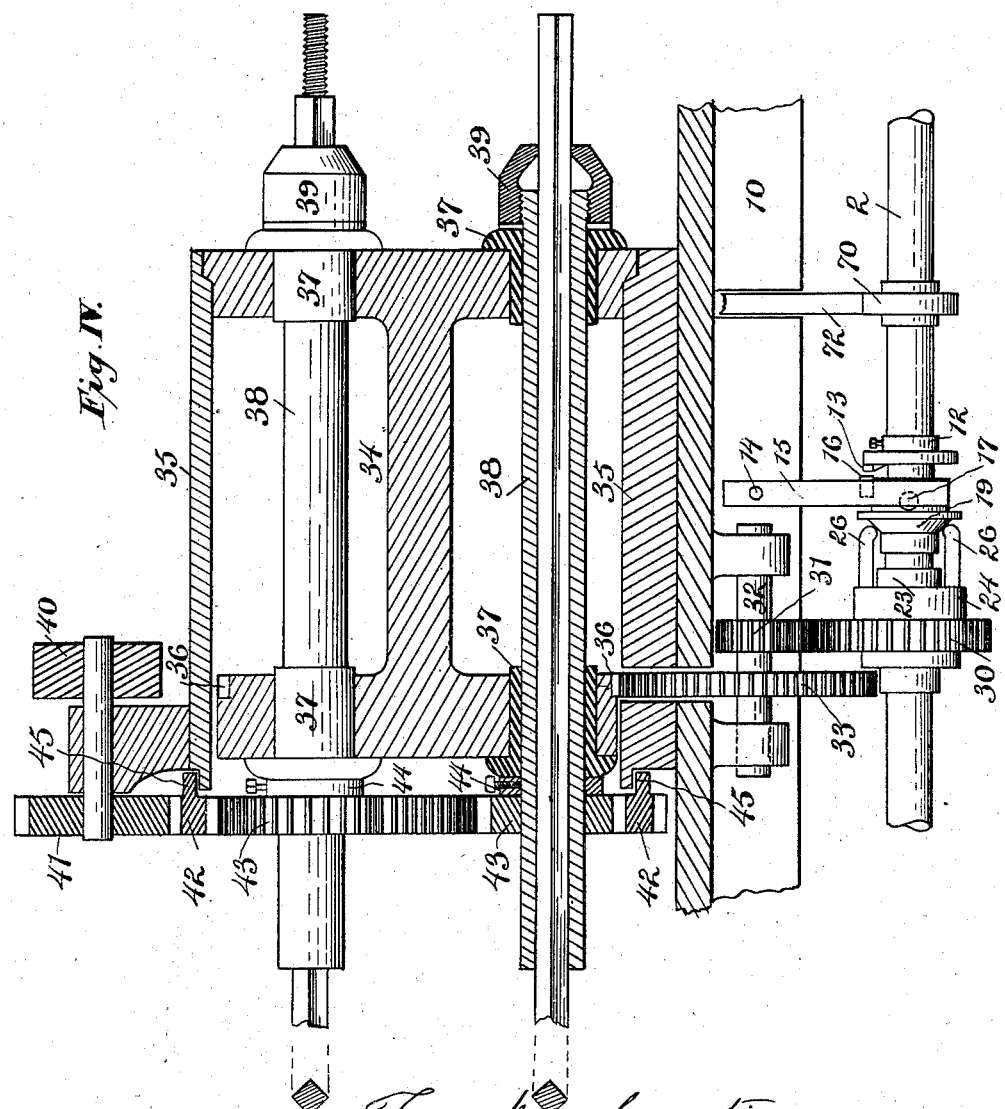

No. 712,506. Patented Nov. 4, 1902.
F. CURTIS.
SCREW MAKING MACHINE.
(Application filed Jan. 20, 1902.)
(No Model.) 6 Sheets—Sheet 4.
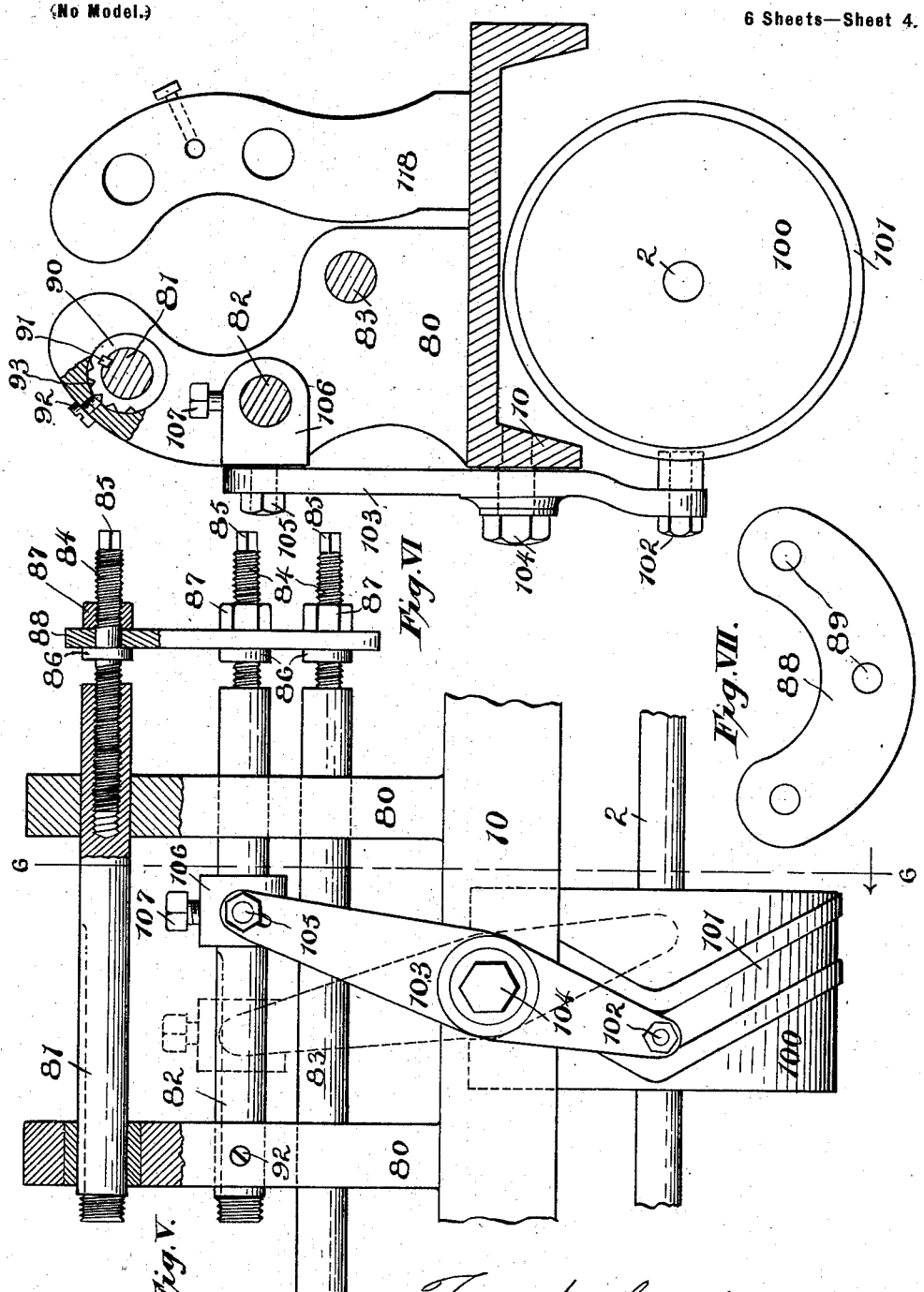

No. 712,506. Patented Nov. 4, 1902.
F. CURTIS.
SCREW MAKING MACHINE.
(Application filed Jan. 20, 1902.)
(No Model.) 6 Sheets—Sheet 5.
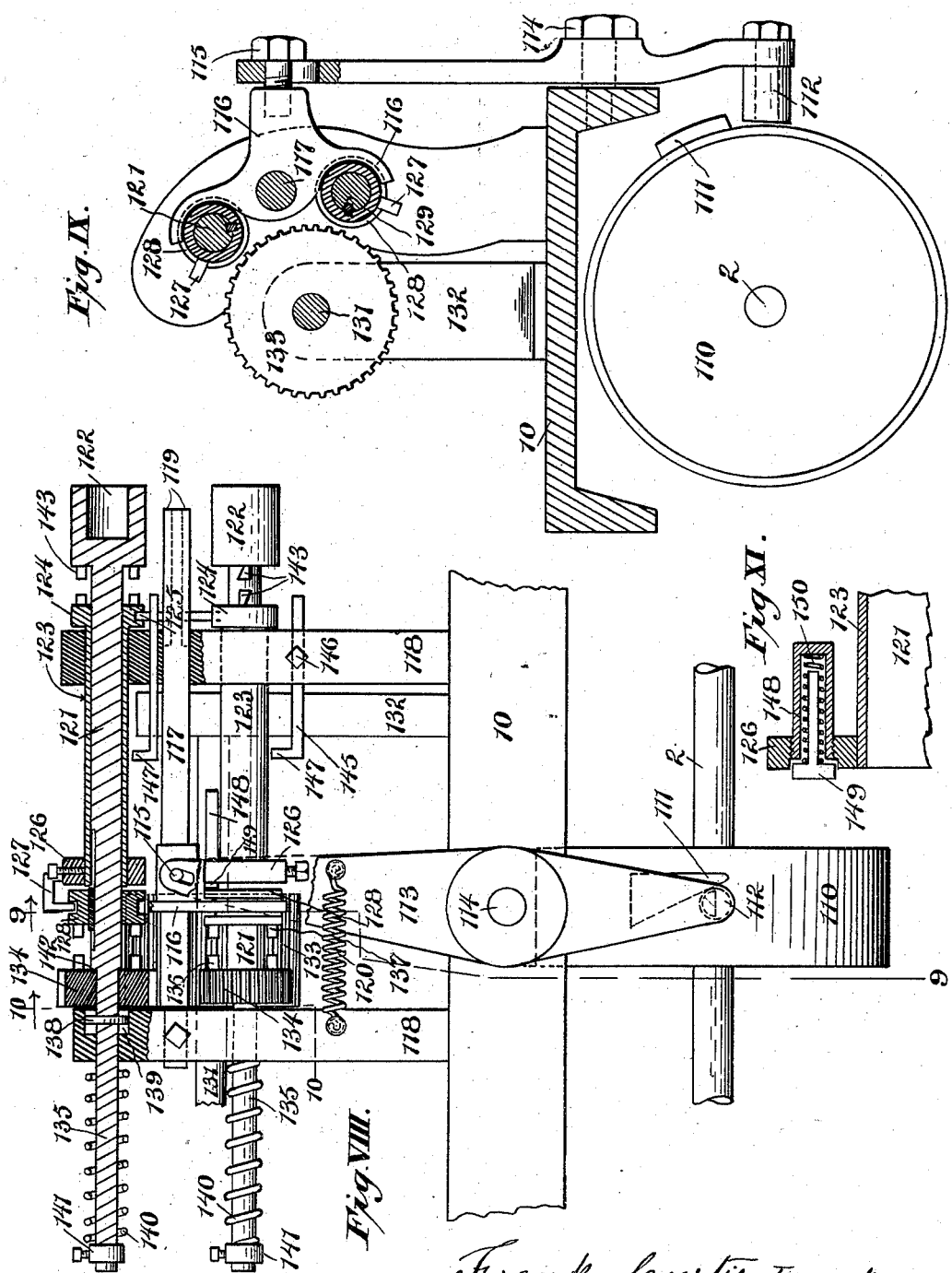
Witnesses:
Geo. E. Drech.
F. R. Fitton.
Frank Curtis Inventor
By
Collamer & Co.,
Attorneys.

No. 712,506. Patented Nov. 4, 1902.
F. CURTIS.
SCREW MAKING MACHINE.
(Application filed Jan. 20, 1902.)
(No Model.) 6 Sheets—Sheet 6.
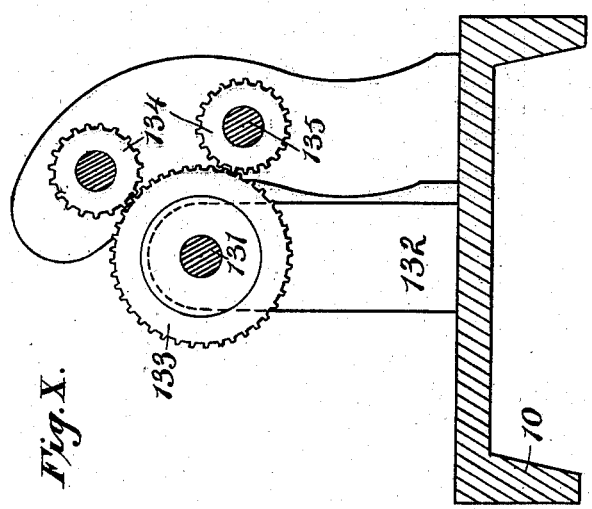
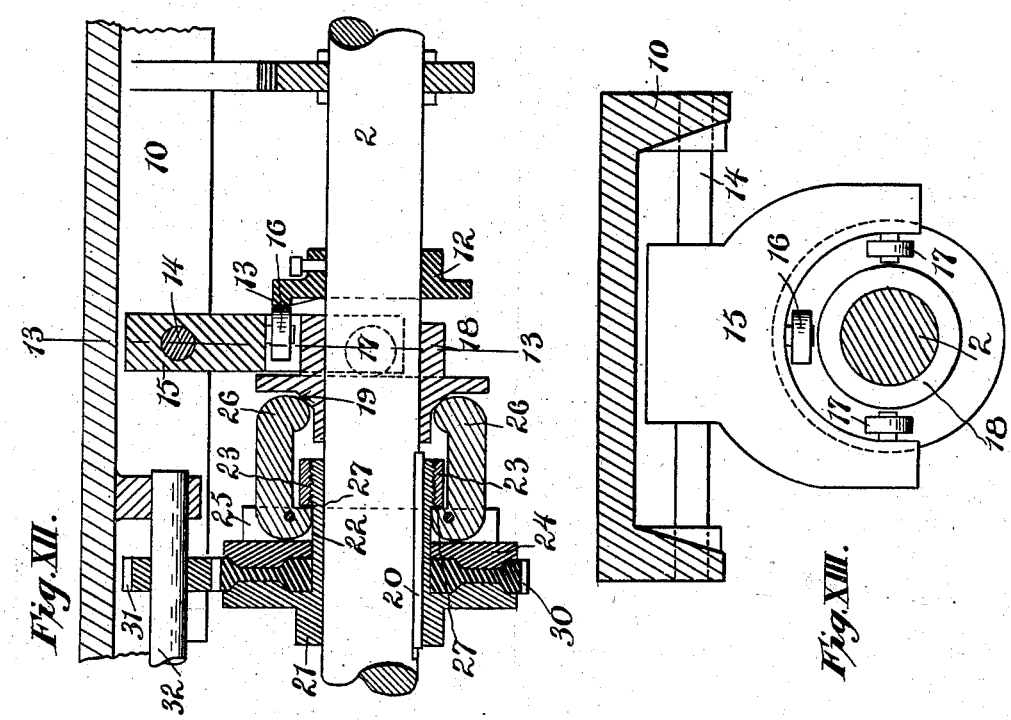
Witnesses: Frank Curtis Inventor
By
Collamer & Co.,
Attorneys

UNITED STATES PATENT OFFICE.

FRANK CURTIS, OF INGERSOLL, CANADA.

SCREW-MAKING MACHINE.

SPECIFICATION forming part of Letters Patent No. 712,506, dated November 4, 1902.

Application filed January 20, 1902. Serial No. 90,428. (No model.)

*To all whom it may concern:*

Be it known that I, FRANK CURTIS, a citizen of the United States, and a resident of Ingersoll, Oxford county, Province of Ontario, Dominion of Canada, have invented certain new and useful Improvements in Screw-Making Machines; and my preferred manner of carrying out the invention is set forth in the following full, clear, and exact description, terminating with claims particularly specifying the novelty.

This invention relates to metal-working machines, and more especially to those designed for making screws; and the object of the same is to produce a machine which shall be entirely automatic in its operation and of such construction as to turn out very rapidly a series of screws which are complete except for the finishing—that is to say, the contour of the bar of stock used constitutes the shape of the head, and my machine turns the reduced body thereof and cuts the thread thereon, and with this machine it is understood that there are to be employed devices for automatically cutting or severing each finished screw from the stock-bar before the latter is ready for the next operation, and it is also to be understood that the finished screws may thereafter be polished or treated in any desired manner before they are boxed for shipment.

To this end the present invention consists in the construction of a machine of this character on substantially the lines hereinafter more fully set forth, by which is produced mechanism proven by actual experiment to have turned out a materially larger number of screws in a given time than any machine now on the market.

In the accompanying drawings, Figure I is a front elevation of this machine complete. Fig. II is a section on the line 2 2 of Fig. I, giving an end view of the live-spindle head removed from the base. Fig. III is a section on the line 3 3 of Fig. I. Fig. IV is a longitudinal section of the live-spindle head and an elevation of the friction-clutch and the mechanism connecting these two parts. Fig. V is an enlarged front elevation of the dead-spindles and guide, partly in section, and the cam for moving the dead or tool spindles and the stop. Fig. VI is a section on the line 6 6 of Fig. V. Fig. VII is a detail of the connector between the tool-spindles and the stop. Fig. VIII is an enlarged rear elevation, partly in section, of the die-spindles and guide and the mechanism for operating them. Figs. IX and X are sections on the lines 9 9 and 10 10 of Fig. VIII. Fig. XI is an enlarged detail of a safety device to be described hereinafter. Fig. XII is an enlarged longitudinal section of the friction-clutch. Fig. XIII is a cross-section on the line 13 13 of Fig. XII.

Referring to the said drawings, the numerals 1 designate the base of this machine, which supports the superstructure, and in this base is journaled a cam-shaft 2. The cam-shaft 2 is driven by power, which in the present instance is a belt 3, leading from a suitable source, although, of course, it might be gearing. By preference I interpose between the power-wheel 4 and the shaft 2 a safety device, (best seen at the right of Fig. I,) which is of the following construction. Said power-wheel here drives a worm 5, which engages a worm-wheel 6, mounted loosely on the shaft 2 between fixed collars 7, and through one of said collars are threaded screws 8, directed toward the worm-wheel 6. The purpose of this construction is to permit said worm-wheel, which is driven with great force by the worm, to slip between the collars and therefore to turn upon the cam-shaft 2 at times when through any interruption or accident the rotation of the cam-shaft may be temporarily checked or retarded, and hence this safety device prevents the breakage of the machinery or its product if the screws 8 are set to the desired tension. It will be well understood, however, that I reserve the privilege of employing a safety device of any other equivalent construction or of omitting the safety device altogether, if preferred.

Upon the base is supported the bed 10, which in turn carries the various parts of the machine described below as the spindle-driving mechanism, the live-spindle head, the spindle or tool guide, the die-spindle guide, and the die-spindle retractor. Upon the cam-shaft is mounted the friction-clutch and cam for intermittently turning the spindle-head, the cam for operating the mechanism which locks and releases this head, and the two cams which move the various spindles and the stop.

These parts will now be described, working as far as possible from the left end of Fig. I toward the right.

Referring more especially to Figs. XII and XIII, I preferably employ a friction-clutch of the following construction for intermittently turning the spindle-head through the mechanism shown in Fig. IV: On the cam-shaft 2 is fixedly mounted a cam 12, having a longitudinal cam-face 13 at one point, as shown herein. Pivoted, as at 14, within the bed 10 is a yoke 15, carrying a plurality of rollers 16 and 17, the former being so disposed within the yoke as to be struck by the cam-face 13, while the rollers 17 are so disposed as to project to the other side of the yoke and bear against a collar 18, which is mounted loosely on the shaft 2 and has a cone-face 19. 20 is a key or any equivalent device by which there is fastened to the shaft a collar 21, having a hub 22, around which is screwed a band 23, which is adjustable. 24 is a second collar, mounted movably upon said hub 22 and having a slotted hub 25, in whose slots are pivoted levers 26, each having an angularly-disposed nose 27, bearing against said band 23, while its outer rounded end rests upon said cone 19. Between the collars 21 and 24 and mounted loosely on the hub 22 is a driving-gear 30, meshing with a smaller gear 31 on a counter-shaft 32, mounted in bearings in the bed 10, and this counter-shaft carries a larger gear 33, which extends upward through the case 35 of the live-spindle head 34 and engages teeth 36 thereon. Such head turns within the case, as best seen in Fig. IV, and in the present machine it is constructed like a spool in whose ends are fixed boxes 37, in which are mounted live-spindles 38, each having a chuck 39, as usual. Power applied through belting or gearing to the wheel 40 drives the gear 41, which meshes with the outer series of teeth on a rim-gear 42, (see Figs. II and IV,) and the inner teeth on this rim mesh with a series of gears 43, each of which is fast on a spindle 38. Thus when the power-wheel 40 rotates the various spindles rotate within their boxes 37, and this movement is independent of the turning of the head 34 within the case. 44 designates collars between the gears 43 and the boxes 37 at the outer end of the live-spindle head. The rim-wheel 42 preferably has a flange 45 turning around the end of the casing 35, as indicated in Fig. IV.

In Fig. III is best seen the mechanism for locking and releasing the head 34 within the casing or shell 35. 50 designates recesses located all in a single plane through one end of said head, there being as many recesses as there are spindles. Within a chamber 51 at one side of the casing 35 is located a latch 52, pressed normally forwardly by a spring 53, whose tension is adjustable by a screw 54, and when a recess 50 is brought into register with the line of this latch its spring throws its inclined or beveled tip thereinto, so as to prevent further turning of the head within the case. In connection with the latch I have shown and I preferably employ a tightening device consisting of a wedge 55, resting on the inclined bottom 56 of the chamber 51, and a screw 57 for adjusting this wedge to take up wear of the latch; but this tightening device might be omitted or could be replaced by other equivalent mechanism. In said Fig. III, I have shown at the opposite side a similar chamber 61, with all similar parts therein, which I have numbered to correspond with those used in the paragraph above. The tip of this latch is inclined in the opposite direction, though it engages the same series of recesses 50, and it follows that its function is to prevent a retrograde movement within the head or shell 35. This retaining-latch may or may not be used, as desired, and by experiment I have found that it is not absolutely necessary, especially if all the cutting mechanism operating on the work in this machine has a tendency to turn the head in the direction of the arrow in this view.

Mounted on the cam-shaft 2 is a cam 70. In the present instance this cam is a disk, as best seen in Fig. III, with a cam face or projection 71 at one point, and in the rotation of this disk this face passes under one end of a trigger 72, suitably pivoted and supported, as at 73. The other end 74 of this trigger enters an opening 75 in the bottom of the chamber 51, passing through a similar opening 76 in the wedge 55 (if the latter is employed) and extends into an opening 77 in the latch 52, and the movement of the trigger retracts the latch, so as to permit the turning of the head at the proper times.

Mounted in standards 80, rising from the bed 10, are the dead or tool spindles, and in the present instance I have shown two of them, (numbered 81 and 82,) while there is a third member, (numbered 83,) which is used as a stop, as described below. It will be understood that there may be a greater or less number of spindles and that the stop is not necessarily of this construction. By preference a screw 84 enters the rear end of each of these members and is squared or made angular, as at 85, or otherwise shaped at its outer end to permit its adjustment within the spindle. On this screw is formed a fixed shoulder 86, and outside of the same is a jam-nut 87. 88 (see Fig. VII) is a connector having holes 89 spaced to receive these various screws 84, and it is clear that the several nuts 87 may be loosened to permit the turning of the screws and then tightened to clamp the connector between them and the shoulders 86.

The spindles pass through collars 90, mounted within the front standards 80, as best seen in Figs. V and VI, and are splined within said collars, as at 91, so as to prevent the rotation of those dead-spindles, but permit their longitudinal adjustment when adjusted by the screws 84, above described. In order to permit the rotary adjustment of any spindle when desired, I mount each collar 90 loosely within the standard and employ a set-screw 92, preferably pointed at its inner end, to take into notches 93 in the collar. 94 designates tool-holders, which are mounted upon the inner ends of the spindles 81 and 82, being preferably screwed thereon. The mechanism for moving these dead-spindles longitudinally consists of a cam 100, fast upon the shaft 2 and having a cam-groove 101 of proper shape. Within the latter travels a roller or pin 102 at the lower end of a lever 103, which is pivoted, as at 104, to the bed 10, and the upper end of this lever is connected with one of the dead or tool spindles in any suitable way. In the present instance I have shown said upper end of the lever pivoted, as at 105, to a block 106, which surrounds the spindle 82 and is rendered adjustable thereon by means of a set-screw 107, although it will be clear that other forms of connection could be employed. By means of the connector 88, above described, when the spindle 82 is moved longitudinally by the cam and lever the other spindle or spindles and the stop 83 are moved with it, yet each is capable of individual longitudinal adjustment, and each spindle is capable of rotary adjustment by means of the collar 90.

110 is a cam or wheel fast on the shaft 2 and having a cam-face 111 on its periphery properly located and shaped to strike a roller or other projection 112 on the lower end of a lever 113, which is pivoted at 114 to the bed 10. The upper end of this lever is loosely pivoted at 115 to a fork 116, which slides longitudinally on a guide-rod 117, fixedly mounted in two standards 118 and extending beyond the forward or inner standard, where it is provided with two grooves 119, as indicated in dotted lines in Fig. VIII, and the lever 113, and with it the fork, is held against the tendency of said cam-face in the present instance by a spring 120, although this could be avoided by a different shape of cam-face.

Mounted for longitudinal and rotary movements in the two standards 118 are the die-spindles 121, two being shown in the present instance and each having a die-holder 122 at its forward or inner end. Each spindle, near its inner end, is mounted loosely within a long sleeve 123, which extends through the standard 118 and has an integral head 124 at its inner end, this head having a pin 125, which moves in one of the grooves 119 in the guide-rod 117. Upon the other end of this sleeve is mounted a collar 126, and from each collar projects rigidly a hook 127, whose tip enters loosely into the groove of a clutch member 128, which is splined, as at 129, on the spindle. The arms of the fork 116 above mentioned also enter the groove of these clutch members, whereby the latter are moved to and fro under the impulse of the cam-face 111 and the spring 120.

The die-spindle-rotating mechanism consists of a power-gear 130, driven by belting or gearing and fixed on a shaft 131, which is journaled in standards 132. This shaft carries a drum-gear 133, which engages driven gears 134, mounted loosely on reduced portions 135 of the spindles 121, as best seen in Fig. VIII, and said gears 134 have pins 136, adapted to engage other pins 137 on the clutch members 128, as will be understood. Said reduced portion 135 of each spindle, after passing through the gear 134, has a collar 138 fixed thereon and permitting slight longitudinal movement within a cavity 139 in the rear standard 118. Continuing through said standard, the reduced portion of the spindle is surrounded by a spring 140, exerting expansive force between said standard and a collar 141 at the extreme end of the spindle and having a tendency to hold the latter normally in its outermost position. This tendency holds the shoulder 142, which separates the body 121 of the spindle from its reduced portion 135, normally against the toothed clutch member, which is the driven gear 134, and presses the latter normally toward the rear standard 118, while if the spindle is moved inward the collar 138 will obviously cause the gear 134 to move with it and the length of the driving or drum gear 133 will prevent the cessation of rotation. In the adjacent faces of the holders 122 and the sleeve-heads 124 are pins 143, having inclined engaging faces, as seen in Fig. VIII, and as one member is revoluble and the other is not these pins located therein produce a clutch.

145 designates stops adjustable under the set-screws 146 in the inner standard 118 and having their inner ends 147 upturned or shaped so as to be struck by the collars 126, all for a purpose to be hereinafter described.

Referring now to Fig. XI, 148 is a pocket, which is by preference screwed into each collar 126 and opens through the same toward the adjacent clutch member 128, and within this pocket is a stop 149, pressed outward by a spring 150, which is of greater power than the spring 140, the purpose of this stop being also hereinafter explained, and in order that it may be operated successfully there is a trifling lost motion between the tip of the hook 127 and the walls of the groove in said clutch member 128.

With the above construction of parts the operation of my machine is as follows, the parts being properly shaped and timed so as to perform their functions in correct relations to each other and power being applied at 4, 40, and 130, as above indicated: Bars of iron, forming the stock from which the screws are to be made, are inserted from the left in Fig. I one at a time through the empty spindle 38 as it is moved by the turning of the head 34 to the lowermost position, and each bar is then pushed inward until its inner end strikes the stop 83, which permits the bar to project beyond the chuck 39 for just a distance which will be the length of the finished screw. It is understood that the contour of this bar is that of the head of the finished screw, which obviates the necessity for doing more with my machine than turning the body of the screw, threading it, and then severing it with its head from the stock remaining, and it is also to be understood that the stock-bar is loosened and tightened in the chuck 39 on the lowermost spindle either by hand or by mechanism forming no part of the present invention, and therefore not illustrated and described herein. I have also not shown the roughing-tool, which is mounted in the lowermost tool-holder 94, nor the finishing-tool, which is mounted in the uppermost tool-holder 94. These turn out the body of the screw. Nor have I shown the first and second dies, which are mounted, respectively, in the upper and lower die-holders 122 and cut the thread upon said body; but it will be clear that as the blank progresses under the turning of the head in the direction of the arrow in Fig. III the stock will move upward from the lowermost position in Fig. I and be operated upon in turn by the roughing-tool, then the finishing-tool, and then it will pass over the top and downward at the rear, so as to be operated upon by the upper or first die and finally the lower or second die of Fig. VIII, after which the finished screw is severed and the spindle reaches the bottom position again, where the stock is fed forward for a new operation. The cam 70 is so set upon the shaft 2 that its face 71 is properly timed to act on the trigger 72 and retract the latch 52 just before the cam-face 13 acts on the roller 16 and swings the yoke 15. The latter movement presses the cone 19 between the rounded ends 28 of the levers 26 and causes them, through their pivotal connections with the hub 25, to move the collar 24 toward the collar 21. The driving-gear 30 is thus temporarily clamped between these collars and turned for a partial revolution with the shaft 2, and through the intermediate gearing 31 and 33 it imparts a partial rotation to the head 34, which by the length of the cam-face 13 is just sufficient to turn the head a distance which in the present instance is one-fifth of a revolution. However, in order to be certain that the distance turned is the proper one, at the moment the spindle containing the then shortest bar of stock reaches the lowermost position the latch 52 engages a recess 50, and the retaining-latch 62 (if it is employed) engages another recess 50 on the other side. It will be understood that while the empty lowermost spindle is being filled or the stock therein fed forward against the stop the tools and dies are performing their work on the other material, and also that the new stock is not supplied or fed forward until the finished screw has been cut off. In order to have this work performed, the spindle-driving mechanism above described is rotating the five spindles at the required speed, but the fact that it rotates the spindle through which the new stock is being fed is not detrimental to the successful operation of my machine.

The cam 100 is of such size and its groove 101 so shaped that after the finished screw has been severed at the rear of the machine and the mechanism above described has turned the head 34 to bring the stock from which the screw was cut to the lowermost position the feed of the stock commences and the cam, through the lever 103, simultaneously moves forward the three spindles shown in Fig. V. During this forward movement the roughing-tool operates on the stock which has last been fed forward, and the finishing-tool operates on the material which has last been roughened, and just at the moment when these two tools have finished their work the stop strikes the projected extremity of the new piece of stock and the feed of the latter terminates, while the groove in the cam 100 has done its complete work and the retraction of the three spindles now commences. It is quite obvious that the cam-groove may be so shaped as to cause this retraction to be more speedy than the forward movement. When these members have resumed their original position, the head 34 is turned forward one additional step, which obviously carries the first piece of material whose turning is finished over to the rear of the machine ready to be treated by the first die and necessarily moves the roughened piece of material up into position for operation by the finishing-tool.

Having explained the manner of operating the head 34, of feeding the stock, and of roughing and finishing the body of the screw being made, it remains only to cut the thread thereon, and this is accomplished by dies of the usual construction, which are mounted in the holders 122 and operated by mechanism best seen in Fig. VIII. It is to be understood that as the finished material passes over the top of the machine it is operated on first by the upper or first die, which produces a partial thread, and then by the lower or second die, which finishes this thread, although it is clear that the screw might be finished by one die, as it is not necessary in all cases to have both dies. Beginning with the parts in the position shown in Fig. VIII, as the cam 111 strikes the roller 112 the lever 113 moves the fork 116 to the right and with it moves the two clutch members 128, which are splined on the spindles 121. The lost motion of the tips of the hooks 127 within the grooves of these members permits the latter to strike the collars 126, which, with the sleeves 123, are also moved to the right, their heads 124 being prevented from rotation by the pins 125 and grooves 119. As soon as the pins 143 on these heads and on the adjacent faces of the die-holders 122 engage, the spindles commence to move forward, though without rotation, and when the mouths of the dies engage the extremities of the rotating pieces of stock the turning of the latter tends to more tightly engage the inclined faces of the pins 143. Just at this time the roller 112 passes the cam 111, and the spring 120 would return the parts to the position shown if it were not for the engagement of said inclined faces of the pins 143. Meanwhile the collars 138 have been retaining the gears 134 in position against the shoulders 142, and these gears are rotated constantly in the same direction as the live-spindles, but with greater speed, by the shaft 131, which is driven by power from the point 130. The gears 134 have therefore been moved along on the drum-gear 133, though they yet remain in mesh therewith. The pitch of the thread within the dies now draws the latter farther forward, and clutch-pins 143 draw all parts also forward until the threads on the screws are finished, and just at this moment the collars 126 strike the ends 147 of the stops 145, so that further forward movement of the die-holder forcibly disengages the clutch formed by the pins 143, and the dies, with the holders and their spindles, immediately begin to rotate with the screw. The spring 120 now immediately returns the sleeves 123, collars 126, fork 116, and clutch members 128 to the left until the pins 137 engage the pins 136 on the rapidly-rotating gears 134, and the latter causes an accelerated rotation of the spindles in the same direction, which draws the dies off the screws they have just made and returns the parts to the position shown in Fig. VIII.

I have spoken of a certain looseness which the tip of the hook 127 has within the groove of the clutch member 128 and which allows a little lost motion in the longitudinal movement of these parts, and the purpose of this lost motion will now appear. In machines of this character the first die usually cuts only part of the depth of the thread and the second die finishes it, and it is clear that unless the thread in the second die be started accurately within the partial thread cut on the stock by the first die the first or partial thread cut thereon will be ruined, this being known as "crossing the thread." In Fig. XI is shown one form of safety device which I employ for preventing this contingency. Secured to, as by being screwed into, the collar 126 of the second-die sleeve is a pocket 148, having a spring-pressed stop 149, as described above, and when the clutch member 128 moves forward it makes a yielding contact with the collar 126 rather than a positive contact, as may be made between the other clutch member and collar. The result is that the yielding of the stop permits the mouth of the finishing-die and the threads therein to accommodate themselves to the threads which have been partially formed by the first die, and hence the threads in the finishing-die adjust themselves properly to the threads which have been made on the stock by the first die. I consider this an important feature of my invention, and experience has proven that it saves a large percentage of waste; but it is clear that other forms of safety device could be employed at this point, the essential feature being to permit a slight yielding at the moment that the mouth of the finishing-die engages the tip of the stock which has already been provided with a partial thread.

During all of the above operation should anything occur by accident or design which checks or retards the proper operation of the mechanisms connected with and driven by the four cams on the cam-shaft 2 the safety device shown at the right end of Fig. I will permit this shaft to cease its rotation either temporarily or for sufficient time to call attention to the abnormal condition; but I consider it hardly necessary to employ safety devices at the point 140 and 130, for the double reason that power can here be applied by belting, which always permits certain slipping in cases of emergency, and also because the work performed by these belts is not such as would ordinarily cause destruction of stock or machine.

I do not confine myself strictly to the details of construction above described nor to their use simultaneously in a single machine, although by practical experience I am convinced that they work successfully together. Some collateral elements are not illustrated, as they form no part of my invention; but they have been referred to because their use is well known, if not necessary. The sizes, shapes, and proportions of parts are not essentially those employed herein, and the material used is preferably entirely metal except the belting. It is clear that a greater or lesser number of spindles could be employed without departing from the spirit of my invention.

Having described my invention, what I claim as new, and desire to secure by Letters Patent, is—

1. In a screw-making machine, the combination with a plurality of live-spindles; of standards, dead-tool spindles movable therein, a stop also movable therein, a connector between the spindles and stop, means for moving these members simultaneously, other dead-spindles movable in the standards for carrying dies, and means for operating these spindles independently of the tool-spindles.

2. In a machine of the character described, the combination with a spindle-head having recesses, spindles located in said head, and means for turning the head intermittently, of a sliding spring-pressed latch whose tip is adapted to engage one of said recesses, means for tripping this latch just before the turning of the head commences, a latch-chamber having an inclined bottom, and a wedge thereon beneath the latch, as and for the purpose set forth.

3. In a machine of the character described, the combination with a spindle-head having a series of peripheral recesses in a single plane, spindles located in said head, and means for turning the head intermittently;

of a retaining-latch having a beveled tip adapted to engage one of said recesses, another latch whose tip is oppositely beveled and adapted to engage another of the same series of recesses, means for tripping this latch just before the turning of the head commences, chambers for the latches disposed at opposite sides of the head and having inclined bottoms, and independent wedges on said bottoms below the latches.

4. In a screw-making machine, the combination with the live-spindles; of two die-holding spindles, means for moving them backward and forward, a safety device interposed between one spindle and the means for moving it forward, and means for rotating both spindles in the direction in which the live-spindles rotate, but more rapidly, after the screw has been threaded, as and for the purpose set forth.

5. In a screw-making machine, the combination with the live-spindles, and means for roughing and finishing the stock so as to produce screw-bodies; of two die-holding spindles of which the first die forms a partial thread on the screw-body just turned and the second completes it, means for operating these spindles, and a spring-pressed stop interposed between said operating means and the finishing-spindle, as and for the purpose set forth.

6. In a screw-making machine, the combination with the head containing a plurality of live-spindles, and means for turning said head intermittently; of a series of dead-spindles carrying dies, a second series carrying tools, a stop connected with said second series whereby tools, dies, and stop stand in alinement with the live-spindles, a single means for moving the die-spindles in one group, and independent means for moving the tool-spindles and stop in another group forward and backward, as and for the purpose set forth.

7. In a screw-making machine, the combination with a plurality of live-spindles; of standards, dead-spindles movable therein, a stop also movable therein, a connector adjustably attached independently to the spindles and stop, and means for moving these members simultaneously.

8. In a screw-making machine, the combination with the live-spindles, the die-spindles, clutch members splined on the latter, a fork engaging said members, and means for moving the fork backward and forward; of mechanism for preventing the rotation of the die-spindles during their forward movement, other clutch members loose on these spindles and rotating constantly in the same direction as the live-spindles, and means for disengaging said mechanism which prevents rotation and engaging said clutch members at the moment the thread on the screw is finished, as and for the purpose set forth.

9. In a screw-making machine, the combination with the live-spindles, the die-spindles, clutch members splined on the latter, and means for moving these members backward and forward; of a drum-gear, driven gears loose on the spindles and constantly engaging said drum, means for causing these gears to move longitudinally with the spindles, and pins in these gears and on said clutch members whereby the die-spindles are rotated in the same direction as but more rapidly than the live-spindles when said pins are in engagement, as and for the purpose set forth.

10. In a screw-making machine, the combination with the live-spindles, the die-spindles, a sleeve surrounding each of the latter and having a head, clutch elements between this head and the die-holder, and means for preventing the rotation of said head; of another clutch whereof one member is splined on the spindle and the other is loose thereon and rotated constantly, means for moving the splined member backward and forward, and connections between this member and said sleeve.

11. In a screw-making machine, the combination with the live-spindles, the die-spindles, a sleeve surrounding each of the latter and having a head, clutch elements between this head and the die-holder, and means for preventing the rotation of said head; of another clutch whereof one member is splined on the spindle and the other is loose thereon and rotated constantly, means for moving the splined member backward and forward, a collar on the inner end of said sleeve adjacent the splined clutch member, the latter being provided with an annular groove, and a hook projecting from the collar and engaging said groove, as and for the purpose set forth.

12. In a screw-making machine, the combination with the live-spindles, the die-spindles, a sleeve surrounding each of the latter and having a head, clutch elements between this head and the die-holder, and means for preventing the rotation of said head; of an annularly-grooved member splined on the spindle, means for moving this member backward and forward, a collar fast on the sleeve adjacent this member, a hook on the collar engaging said groove and having a certain lost motion, and a yielding stop carried by the collar of the finishing-die spindle, as and for the purpose set forth.

13. In a screw-making machine, the combination with a live-spindle, a die-spindle, a sleeve surrounding the latter and having a head, means for preventing rotation of this sleeve, and pins on the head and the die-holder forming clutch elements and having inclined engaging faces; of means for moving the sleeve forward, a stop for checking such movement at a predetermined point, and yielding means for drawing the spindle and sleeve in a direction opposed to the frictional pull of said clutch-pins.

14. In a screw-making machine, the combination with the live-spindles, the die-spindles, a sleeve surrounding each of the latter and having a head, means for preventing rotation of this sleeve, and pins on the head and the die-holder forming clutch elements and having inclined engaging faces; of a collar on said sleeve, a stop for positively preventing forward movement of the sleeve, means for moving the collar forward and backward, and yielding means for drawing the spindle in a direction opposed to the frictional pull of said clutch-pins.

15. In a screw-making machine, the combination with the live-spindles, the die-spindles, a sleeve surrounding each of the latter and having a head, means for preventing rotation of this sleeve, and pins on the head and die-holder forming clutch elements and having inclined engaging faces; of a collar on said sleeve, a stop for positively preventing forward movement of the collar, a member splined on the spindle adjacent to the collar, connections between these elements permitting a certain lost motion, as said splined member moves forward, means for moving the splined member forward and backward, and yielding means for drawing the spindle in a direction opposed to the frictional pull of said clutch-pins, as and for the purpose set forth.

In testimony whereof I have hereunto subscribed my signature this 15th day of January, A. D. 1902.

FRANK CURTIS.

Witnesses:
N. L. COLLAMER,
F. R. FITTON.